Figures 6, 7, 8, 9:
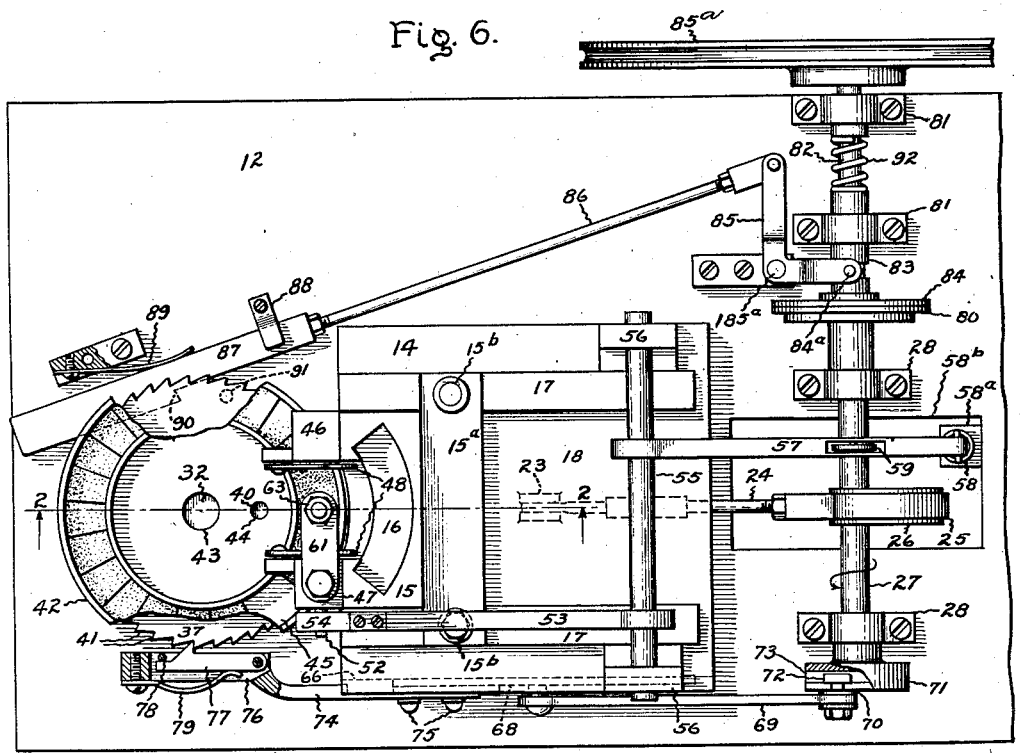

Jan. 7, 1930. F. S. GODFREY 1,742,388
MACHINE FOR FORMING RINGS FROM SEGMENTAL PIECES
Filed Oct. 20, 1925  2 Sheets-Sheet 1
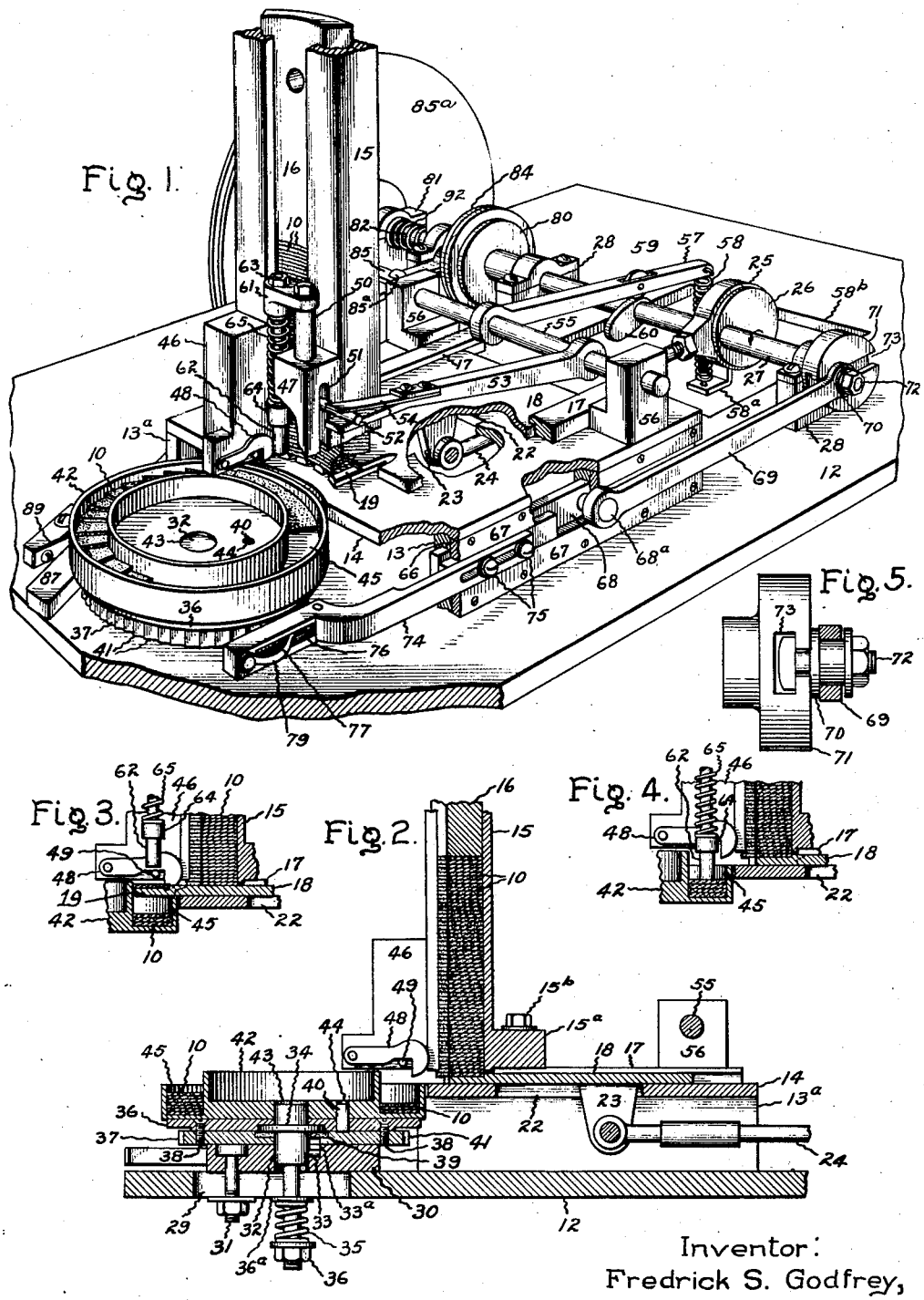
Inventor:
Fredrick S. Godfrey,
by *Alexander S. Lamb*
His Attorney.

Jan. 7, 1930.　　　　F. S. GODFREY　　　　1,742,388
MACHINE FOR FORMING RINGS FROM SEGMENTAL PIECES
Filed Oct. 20, 1925　　2 Sheets-Sheet 2

Inventor:
Fredrick S. Godfrey,
by
His Attorney.

Patented Jan. 7, 1930

1,742,388

UNITED STATES PATENT OFFICE

FREDRICK S. GODFREY, OF LYNN, MASSACHUSETTS, ASSIGNOR TO GENERAL ELECTRIC COMPANY, A CORPORATION OF NEW YORK

MACHINE FOR FORMING RINGS FROM SEGMENTAL PIECES

Application filed October 20, 1925. Serial No. 63,795.

In certain manufacturing processes it is desirable to form rings of some thickness from comparatively thin segmental pieces, the pieces being stacked successively one on another in partial overlapping relation and afterwards fastened together.

The object of the present invention is to provide an improved machine for performing automatically this work and for a consideration of what is believed to be novel and the invention, attention is directed to the accompanying description and the claims appended thereto.

In the drawing, Figure 1 is a perspective view, partly broken away, of a machine embodying the invention; Fig. 2 is a longitudinal sectional view of part of the machine, the section being taken on line 2—2, Fig. 6; Fig. 3 is a detail view of certain parts showing them in one position; Fig. 4 is a detail view similar to Fig. 3, showing the parts in another position; Fig. 5 is a detail view of a connecting rod connection; Fig. 6 is a plan view of the machine; Fig. 7 is a detail view of a part of a sliding plate; Fig. 8 is a perspective view of the ring which the machine makes; and Fig. 9 is a face view of one of the segments used in making a ring such as that shown in Fig. 8.

Referring first to Figs. 8 and 9, the purpose of the machine is to take a number of segmental pieces 10, such as those shown in Fig. 9, and stack them one on another in partial overlapping relation to form a built-up ring 11 such as that shown in Fig. 8, several layers of the segments being present in the complete ring. In the present instance the segmental pieces are formed of canvas treated with an adhesive binder such as a phenolic condensation product, and after being formed the rings 11 are used in the manufacture of non-metallic gear wheels. A non-metallic gear wheel embodying in its manufacture rings of the type shown in Fig. 8 is illustrated and described in the patent to Guay, 1,501,028, dated July 8, 1924.

12 indicates a support carried by suitable legs (not shown) and upon which the mechanism of the machine is mounted. Directly on top of support 12 are two longitudinally-extending spaced members 13 and 13a on which is mounted a table 14. On table 14 is a chute 15 of a shape to receive segments 10. In Figs. 1 and 2 a number of segments are shown in the chute and above them is a follower 16 which slides in the chute and serves to press the segments downward. On table 14 are arranged two guides 17 in which slides a flat plate 18, the plate resting directly on the top of table 14. The forward end of plate 18 is provided with slots forming teeth 19 and the upper surfaces of teeth 19 are cut away on an arc the same as that of the outer edge of segments 10 providing shoulders 20 adapted to engage a segment 10. Adjacent to the two outermost teeth 19, plate 18 is cut back to provide recesses 21. On table 14 beneath plate 18 is a longitudinally-extending slot 22 and connected to the under side of plate 18 and projecting through slot 22 is an arm 23. Pivoted to arm 23 is a connecting rod 24 which at its rear end is connected to an eccentric strap 25 which surrounds an eccentric 26. Eccentric 26 is mounted on a shaft 27 carried in bearings 28 mounted on support 12. It will thus be seen that when shaft 27 turns, plate 18 will be reciprocated forward and back by means of connecting rod 24, the plate sliding on the top surface of table 14. On the back of chute 15 at its lower end is a cross piece 15a which rests on top of guides 17 and is held by bolts 15b. This cross piece supports chute 15 in spaced relation to the top surface of table 14, whereby plate 18 can slide beneath the chute. When plate 18 is in its retracted position, that is, the position shown in Figs. 1, 2 and 4, shoulders 20 at the rear of teeth 19 stand just back of the rear surfaces of segments 10 so that the lowermost segment of the stack in the chute lies on the fingers in advance of shoulders 20. The shoulders 20 are of a depth slightly less than the thickness of one of the segments.

In support 12 in advance of table 14 is a longitudinally-extending slot 29 and mounted over this slot is a disk 30 which is held in position by a bolt 31. The head of the bolt is countersunk so as to be flush with the surface of disk 30 and has a nut and washer on the under side of support 12. By loosening the nut on bolt 31, disk 30 may be adjusted longitudinally on support 12. In the center of disk 30 is an opening through which projects a stud 32, the stud being attached to disk 30 by a pin 33 which stands in a slot 33ª in disk 30. Adjacent the upper end of stud 32 is a collar 34. The lower end of stud 32 projects down through slot 29 and on it is a spring 35 held between a nut 36 on the lower end of the stud and a washer 36ª which engages the under side of support 12, the washer being loose on the stud.

Supported on disk 30 is a turntable comprising two plates 36 and 37 fastened together by screws 38. At their central portions plates 36 and 37 are provided with recesses, the collar 34 on stud 32 lying in the recess in plate 36. In the recess in plate 37 is arranged suitable friction material 39 against which collar 34 is held by the spring 35 on the lower end of stud 32. By this arrangement the turntable comprising plates 36 and 37 is frictionally connected to disk 30, being free to turn on the disk against the friction between collar 34 and friction material 39. By adjusting the nut on the lower end of stud 32 to vary the tension of spring 35, the desired degree of frictional resistance to the turning of the turntable formed by plates 36 and 37 may be obtained. Stud 32 projects somewhat above the surface of plate 36 and adjacent it in plate 36 is a pin 40. In the edge of plate 37 are ratchet teeth 41.

42 indicates a holder adapted to be placed on the turn table. It has a central opening 43 to receive the upper end of stud 32 and an adjacent opening 44 to receive pin 40. The peripheral portion of holder 42 is in the form of an annular recess 45 in which segments of an annular recess 45 in which segments 10 are stacked in forming a ring 11. The annular groove 45 is of a diameter to form a ring of the desired size and of a width to receive segments 10 and hold them in position. A holder 42 is positioned on the turntable by placing it thereon in such a manner that stud 34 and pin 40 engage in openings 43 and 44. The stud and pin serve to hold it centered on the turntable and to cause it to turn with the turntable. When a holder 42 is placed on the turntable, its rear edge is positioned directly in front of chute 15 and the arrangement is such that when plate 18 is slid forward by means of eccentric 26, fingers 19 are brought directly over annular recess 45. This is shown particularly in Fig. 3. On the forward edges of chute 15 are two blocks 46 and 47. Pivoted on the inner, adjacent faces of blocks 46 and 47 are hooks 48 which are restrained in their downward movement by stops 49. Hooks 48 are pivoted loosely so they tend to fall by gravity. In block 47 is a vertical opening in which slides a post 50 and in the side of block 47 is a slot 51 through which a pin 52 projects, the inner end of the pin being connected to post 50. Engaging the under side of pin 52 is an arm 53, the arm being held yieldingly in contact with the under side of the pin by a leaf spring 54 attached to arm 53 on its upper surface. Arm 53 is fixed on a shaft 55 suitably mounted in bearing standards 56. Fixed on shaft 55 is a rearwardly extending arm 57 which at its outer end is connected by a spring 58 to a bracket 58ª depending from the under side of support 12, support 12 having an opening 58ᵇ through which the spring passes. On arm 57 is a roller 59 adapted to be engaged by a cam 60 fixed on shaft 27, spring 58 serving to hold the roller in engagement with the cam. When shaft 27 rotates cam 60 engages roller 59, thereby moving arm 57 up and down and imparting an oscillating movement to shaft 55. This serves to move arm 53 down and up, thus imparting reciprocating movements to post 50.

Fastened to the upper end of post 50 is a bracket 61 having an opening in its ends through which extends loosely the upper end of a plunger 62, there being a nut 63 on the end of the plunger above the bracket. On the plunger is a shoulder 64 and arranged between shoulder 64 and bracket 61 is a spring 65 which holds plunger 62 yieldingly in its lowermost position. When post 50 is reciprocated, the plunger rod 62 is reciprocated along with it.

Formed on the outer side of member 13 is a groove 66 partly covered by strips 67 thereby providing a way in which slides a bar 68. Bar 68 is connected by a pin 68ª and a link 69 to a spool 70 which is fastened to a disk 71 on shaft 27 by means of a bolt 72, the head of the bolt being in an undercut slot 73 in disk 71. This provides an eccentric connection between link 69 and shaft 27. By changing the position of the bolt head in undercut slot 73, the eccentricity of the connection between link 69 and shaft 27 may be adjusted. With this arrangement it will be seen that, when shaft 27 turns, a reciprocating movement is imparted to bar 68. Connected to the forward end of bar 68 is an arm 74, the connection being made by means of screws 75 which extend through a slot in arm 74 and engage tapped openings in bar 68. By this arrangement the connection of arm 74 with the bar may be adjusted.

In the forward end of arm 74 is a rectangular opening 76 in which is pivoted a pawl 77 normally held against a stop pin 78 by a suitable leaf spring 79. Pawl 77 is adapted to engage ratchet teeth 41 on plate 37. By this means reciprocating movement of bar 68 and arm 74 causes pawl 77 to engage ratchet teeth 41 to impart a step by step turning movement to the turntable comprising plates 36 and 37 and hence to a holder 42 placed thereon.

On the end of shaft 27 opposite to that at which disk 71 is located is a clutch plate 80. Mounted in bearings 81 on support 12 and in line with shaft 27 is a driving shaft 82. Slidably mounted on driving shaft 82 is a sleeve 83 which carries a clutch plate 84 adapted to engage clutch plate 80. Sleeve 83 is suitably splined to shaft 82 so that it turns therewith but may be moved axially thereon. On the outer end of shaft 82 is a pulley wheel 85ª which may be utilized in driving shaft 82. For example, it may be connected by a belt to a suitable electric motor or other driving means. In sleeve 83 is a groove into which projects a pin 84ª on one arm of a bell crank lever 85 which is suitably pivoted at 185ª on support 12. The other arm of bell crank lever 85 is connected by a rod 86 to a head 87 which slides in a guide 88 and which at its outer end is held in engagement with the edge of the disk 30 by a leaf spring 89. In head 87 is a notch 90 adapted to be engaged by a pin 91 (see Fig. 6) projecting downwardly from the under side of plate 37. On driving shaft 82 is a spring 92 which bears against the end of sleeve 83 and biases clutch plate 84 into engagement with clutch plate 80. When pin 91 engages notch 90 it moves rod 86 to turn bell crank lever 85 in a direction to move clutch disk 84 away from clutch disk 80 against the action of spring 92, thereby disconnecting driving shaft 82 from shaft 27.

The operation is as follows: Assume that the parts are in the positions shown in Figs. 1, 2 and 5 of the drawings and that spring 92 is holding clutch 84 in engagement with clutch disk 80 so that shaft 27 is rotating. As seen in Figs. 1 and 2, a segment 10 rests on fingers 19, the plunger 62 is in its uppermost position and connecting rod 69 is at the forward end of its stroke, pawl 77 being in engagement with a ratchet tooth 41. The direction of rotation of shaft 27 is indicated by the arrows in Figs. 1 and 6. In the positions of the parts shown, the depositing of a segment 10 in annular groove 45 has been just completed and the turntable is about to be turned to move holder 42 into position to receive the next segment. As shaft 27 turns in the direction indicated by the arrows from the position it is shown as occupying, rod 69 and arm 74 are retracted, pawl 77 turning the turntable the distance of one ratchet tooth. At the same time eccentric 26 and rod 24 push plate 18 forward to carry the lowermost segment 10 in chute 15 to a position directly over annular groove 45 in holder 42. This is illustrated in Fig. 3. At this time the other segments in chute 15 are supported by plate 18 as is clear from Fig. 3. These movements of arm 74 and plate 18 take place simultaneously and during one-half turn of shaft 27. On the next half turn of shaft 27, the arm 74 is again moved forward to bring pawl 77 into engagement with the next ratchet tooth 41 and plate 18 is retracted.

When plate 18 moves forward from the position shown in Fig. 2, to that shown in Fig. 3, it slides under hooks 48 and the segment 10 on fingers 19 engage the hooks and lifts them so that they slide over the top of the segment. At the completion of the forward movement of plate 18, segment 10 is brought beyond hooks 48 and they drop down behind the segment, the points of the hooks entering recesses 21 in plate 18. Their downward movement is limited by stops 49. This is shown in Fig. 3. Now, when plate 18 is retracted the hooks pull the segment 10 off fingers 19, whereupon it drops into the annular groove 45 in holder 42. Prior to the completion of the return movement of plate 18, cam 60 begins to lift lever arm 57 against the action of spring 58 to lower plunger 62 and just after fingers 19 have moved from under the segment 10, permitting it to drop into annular groove 45, plunger 62 is brought down into engagement with it to force it firmly to its position. This is shown in Fig. 4. The stroke of plunger 62 is completed during the interval while fingers 19 are not over annular groove 45, the down and back movement of the plunger taking place quite quickly. After plunger 62 has moved downward as far as it can go, spring 65 yields to permit of the continued movement of post 50. Leaf spring 54 forms a yielding connection between arm 52 and post 50 so that when plunger 62 is arrested in its movement the shock on pin 52 is cushioned.

Upon each revolution of shaft 27, a segment 10 is deposited in annular groove 45 and the holder turned the distance of one ratchet tooth 41. After the turntable has made a complete revolution, less one ratchet tooth 41, pin 91 engages notch 90, and on the final movement of the turntable, pin 91 moves rod 86 to turn bell crank lever 85 in a direction to move clutch disk 84 away from clutch disk 80. This disconnects driving shaft 82 from shaft 27 and stops shaft 27. The operative then removes holder 42 from the turntable, substitutes an empty holder, and then moves rod 86 outward against the action of spring 89 to release notch 90 from pin 91. Spring 92 then moves clutch plate 84 into engagement with clutch plate 80 thus again connecting driving shaft 82 to shaft 27. The machine then operates to lay a ring of segments in the new holder. It will be seen that in running the machine, the operative has only to change the holders 42 and start the machine by pushing rod 86 outward, the laying of the ring of segments and the stopping of the machine when the ring is completed being automatic.

The number of segments deposited in the holder in forming a complete ring depends upon the number of ratchet teeth on the turntable so that the number of segments may be varied by changing the number of ratchet teeth. By adjusting the position of the turntable by means of bolt 31 and slot 29, it may be positioned to carry a holder of a diameter to make the desired size of ring, arm 74 and bolt 72 being adjusted also to position correctly pawl 77 and to give the required length of stroke to arm 74.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. In a machine for forming rings from segments, the combination of a turntable, a holder supported thereon, means for imparting a step by step turning movement to the turntable, and means for depositing segments in the holder during the intervals between successive step by step movements of the holder to form a continuous ring from the segments.

2. In a machine for forming rings from segments, the combination of a turntable, a holder supported thereon, means for imparting a step by step turning movement to the turntable, a chute adapted to hold segments, a member which moves under the chute to the transferring segments from the chute to the holder, and means for moving said member.

3. In a machine for forming rings from segments, the combination of a support, a chute mounted on the support with its lower end in spaced relation to the support, said chute being adapted to hold segments, a holder, means for supporting said holder adjacent to the chute, a member which moves under the chute for transferring segments from the chute to the holder, and means for moving said member.

4. In a machine for forming rings from segments, the combination of a support, a chute mounted on the support with its lower end in spaced relation to the support, said chute being adapted to hold segments, a holder, means for supporting said holder adjacent to the chute, means for imparting turning movement to the holder, a member which moves under the chute for transferring segments from the chute to the holder, and means for moving said member.

5. In a machine for forming rings from segments, the combination of a support, a chute formed on the support with its lower end in spaced relation to the support, said chute being adapted to hold segments, a holder, means for supporting said holder adjacent to the chute, means for imparting turning movement to the holder, a member which moves under the chute for transferring a segment from the chute to a position directly over the holder, means for moving said member, and means for moving a segment off the member to permit it to drop into the holder.

6. In a machine for forming rings from segments, the combination of a support, a chute formed on the support with its lower end in spaced relation to the support, said chute being adapted to hold segments, a holder, means for supporting said holder adjacent to the chute, means for imparting turning movement to the holder, a member which moves under the chute for transferring a segment from the chute to a position directly over the holder, means for moving said member, means for moving a segment off the member to permit it to drop into the holder, and a plunger for forcing a segment toward the bottom of the holder.

7. In a machine for forming rings from segments, the combination of a support, a chute mounted on the support with its lower end in spaced relation to the support, said chute being adapted to hold segments, a holder, means for mounting said holder in front of the lower end of the chute, means for imparting a step by step turning movement to the holder, a plate which slides forward and back under the chute for transferring segments from the chute to the holder, means for engaging a segment when carried forward by the plate for stripping a segment from the plate when the plate moves backward, and means for moving said plate.

8. In a machine for forming rings from segments, the combination of a support, a chute mounted on the support with its lower end in spaced relation to the support, said chute being adapted to hold segments, a holder, means for mounting said holder in front of the lower end of the chute, a member which slides forward and back under the chute for transferring segments from the chute to the holder, driving means for moving said member and for imparting a step by step turning movement to said holder, and means actuated by the means which imparts the step-by-step movement to the holder for stopping said driving means when the ring is completed.

9. In a machine for forming rings from segments, the combination of a support, a chute mounted on the support with its lower end in spaced relation to the support, said chute being adapted to hold segments, a holder, means for mounting said holder in front of the lower end of the chute, a member which slides forward and back under the chute for transferring segments from the chute to the holder, driving means for moving said member and for imparting a step by step turning movement to said holder, said driving means including a clutch, and means controlled by the means which imparts the step by step movement to the holder for opening the clutch to stop the machine when a ring is completed.

10. In a machine for forming rings from segments, the combination of a base, a turntable mounted on the base, a holder supported on the turntable, means for imparting a step-by-step turning movement to the turntable, means carried by the base for depositing segments in a holder on the turntable during the intervals between successive step-by-step movements of the turntable, and means controlled by the movement of the turntable for stopping said turntable upon the completion of the formation of a ring.

11. In a machine for forming rings from segments, the combination of a base, a turntable mounted on the base, a holder mounted on said turntable, said holder having an annular groove therein, means for imparting turning movement to the turntable, means carried by the base for depositing segments in the groove in the holder on the turntable, and means for forcing segments down into the groove.

12. In a machine for forming rings from segments, the combination of a base, a turntable mounted on the base, a holder supported on said turntable, said holder having an annular groove therein, means for imparting a turning movement to the turntable, means carried by the base for depositing segments in the groove in the holder on the turntable, means for forcing segments down into the groove, and means actuated by a moving part of the machine for automatically stopping the turntable upon the completion of the formation of a ring.

In witness whereof, I have hereunto set my hand this 15th day of October, 1925.

FREDRICK S. GODFREY.